United States Patent
Wen et al.

(10) Patent No.: US 8,601,518 B1
(45) Date of Patent: Dec. 3, 2013

(54) VEHICLE DISPLAY SYSTEM

(71) Applicants: Michael Tai-Hao Wen, Taipei (TW); Wei Li Huang, Taipei (TW)

(72) Inventors: Michael Tai-Hao Wen, Taipei (TW); Wei Li Huang, Taipei (TW)

(73) Assignee: Jet Optoelectronics Co., Ltd., Taipei (TW)

( * ) Notice: Subject to any disclaimer, the term of this patent is extended or adjusted under 35 U.S.C. 154(b) by 0 days.

(21) Appl. No.: 13/674,963

(22) Filed: Nov. 13, 2012

(51) Int. Cl.
 *H04N 7/18* (2006.01)

(52) U.S. Cl.
 USPC .................. 725/75; 725/62; 725/78; 725/79; 725/80; 725/81

(58) Field of Classification Search
 USPC ......................... 725/62, 77–81, 75
 See application file for complete search history.

(56) References Cited

U.S. PATENT DOCUMENTS

| | | | |
|---|---|---|---|
| 2008/0252798 A1* | 10/2008 | Vitito | 348/837 |
| 2010/0304349 A1* | 12/2010 | Kunin | 434/323 |
| 2012/0086247 A1* | 4/2012 | Liu | 297/217.3 |
| 2012/0233644 A1* | 9/2012 | Rao | 725/62 |

* cited by examiner

*Primary Examiner* — Pankaj Kumar
*Assistant Examiner* — Charles N Hicks
(74) *Attorney, Agent, or Firm* — Gokalp Bayramoglu

(57) ABSTRACT

A vehicle entertainment system comprising media player, master unit, slave units and smart devices to control the operation of master unit and slave units. A media placed in the media player can be played and shared between master and slave units. The media can be stored in a storage device to be played at a later time. The media content is shared between master and slave units via cable or wireless communication.

16 Claims, 4 Drawing Sheets

VEHICLE DISPLAY SYSTEM

BACKGROUND

Smart devices use operating systems to control their operations. Applications developed to enable smart devices to perform different functions. These application programs run within the operating system environment. An example of operating systems in a smart device is an operating system known as Android. In a vehicle system, the driver and the passengers holding a smart device such as a smart phone or a smart tablet are able to consume the rich contents provided by these smart mobile devices. When occupants in the vehicle want to watch a DVD or play a CD, they will not be able to do it on these devices.

DVD, CD, and Blue ray discs have reached a significant amount of popularity worldwide over the past decade. These storage medias can store large amount of information, music and movies. They can be played on devices that have DVD, CD and Blue ray device slots that can accept DVD, CD or Blue ray media. Current smart devices do not have DVD, CD or Blue ray slots to accept these media to play.

Even if the system could play DVDs or CDs it still would not solve a common problem a family faces while traveling in a vehicle. It is common for parents to ride in the front seats and for young kids to ride in the back seats. Very often a parent would want to control what children watch and listen to. In other words parents would like to moderate the contents consumed by their kids in the back. This problem is especially visible in families of large size over extended periods of travel.

SUMMARY OF THE INVENTION

The invention is the integration of a DVD player, a CD player, a Blue ray disc player, or a combo player with an operating system used in the vehicle system. More specifically the integration of a DVD player, a CD player, a Blue ray disc player, or a combo player with an operating system used in the vehicle system.

In one embodiment the system comprises a panel and a player, housed in a common housing. As an alternative the panel and the player could be physically separated, housed separately and connected with wires or wirelessly. An operating system used and the operating system can be any popular operating system such as Android, iOS, Windows used by smart devices on the market. We create an algorithm and a software application based on the algorithm to interface and control the physical player.

A common use case is a person slides a DVD into the player and the system begins to play the DVD. The viewer will be able to control the player to make it stop, fast forward, etc.

Another common use case is a person puts in a CD and the system begins to play the CD. The viewer will be able to control the player to make it stop, go to the next song, etc.

In another embodiment, a master unit with an operating system installed in the head unit compartment which is normally accessible only by occupants in the front seats of the car. Then a slave unit is installed, behind the headrest for backseat occupants. There can only be one master unit and there can be more than one slave unit. The master unit and the slave units are connected wirelessly or by using wires. The multimedia player would be installed in the master unit only. The front seat occupant would be in control of the medium, be it a DVD, a CD, or a Blue ray disc, to be played in the system. The slave units can only watch and listen to the contents and cannot control them. However the slave units' screen can be turned on or off and the volume can be adjusted by backseat occupants.

In yet another embodiment, a master unit and a plurality of slave units are installed in a vehicle. At least one smart device exists in the vehicle. The master unit and the slave units are connected wirelessly or by using wires. The multimedia player would be installed in the master unit only. The smart device can control the operation of the master unit and slave units. Furthermore the media that is played on the master unit can be viewed on slave units or on the smart device. This interface and exchange of media is accomplished by modifying the operating system in the master unit, in the slave unit and in the smart device.

DETAILED DESCRIPTION OF PREFERRED EMBODIMENTS

Figure 1:
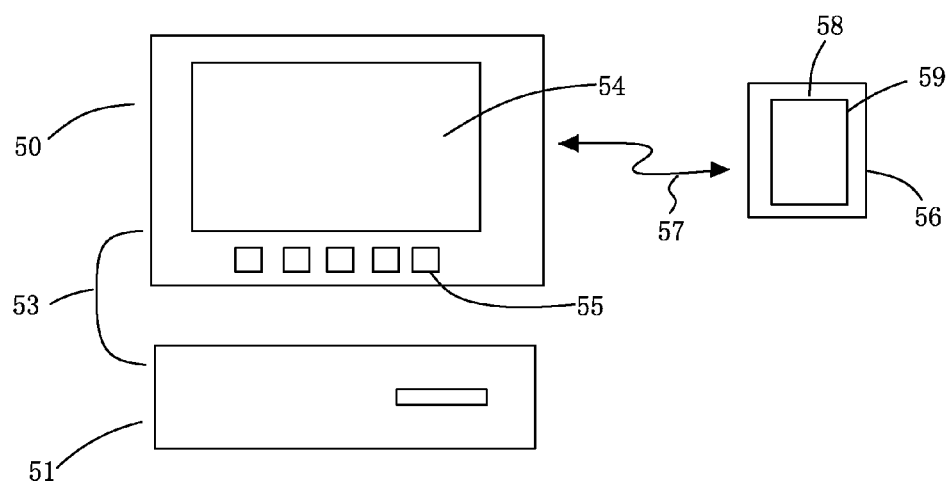
FIG. 1 shows the system configuration with a master unit, media driver and a smart unit

An embodiment of the invention is shown in FIG. 1. Master unit 50 is a display unit or a smart device that has an operating system installed on it to perform several functions. These functions do not include playing a DVD media or CD media or Blue Ray media. Media player 51 is a unit where it may have a DVD drive or a CD drive or a Blue Ray drive or any of the combination of these drives. Connection 53 between media drive 51 and master unit 50 connects the video signals, audio signals and control signals between the master unit 50 and the media player 51. Media player 51 can be placed in the proximity of master unit 50 or media player 51 can be placed in a remote location. If master unit 50 and media player 51 are used in a vehicle then master unit 50 and media player 51 can be either placed next to each other or they can be separated from each other. Media player 51 should be placed in a location in the vehicle such that it would be fairly easy to access to media player 51 to make it easy for users to change the media when they wish to do so.

In another embodiment of the invention media player 51 and master unit 50 are combined into one unit. When master unit 50 is combined with media player 51, connecting wire 53 is built in master unit 50. The combined unit is placed in a location within the vehicle such that users can easily access to the unit to insert a media into it or to remove media from it.

In either embodiments disclosed above, master unit 50 has display 54 to display the video signal coming from the media player 51. Master unit 50 also has a plurality of control buttons on master unit 50. A user can push buttons 55 to control the operation of master unit 50. When a user provides commands to master unit 50 by using the buttons 55, master unit 50 communicates with media player 51 via control signal lines 53. When media player 51 receives commands from master unit 50, it performs different acts based on the incoming command. If the command is a play command then media player 51 starts playing the media and sends the audio and video signals to master unit 50. Master unit 50 displays the video signal on display unit 54.

In another embodiment, display unit 54 has touch control capability and therefore a user can input commands to master unit 50 by touching display unit 54. In this case buttons 55 do not need to exist.

In another embodiment, master unit 50 and media player 51 are controlled by smart device 56. The smart device 56 is a device that has a program running on it and can perform many different functions. For example smart device 56 can be a smart telephone or a smart tablet device. Smart device 56 may or may not have display 59. If smart device 56 does not have display 59 then smart device 56 has buttons to send commands to master unit 50. If smart device 56 has display unit 59 then commands sent to master unit 50 can be entered on the display by using touch screen 58 that is incorporated over display 59. A user will have the option of controlling master unit 50 either by using buttons 55 or by using smart device 56. The connection between master unit 50 and smart device 56 is either a wired or wireless connection 57. Wireless connection 57 can be any communication channel such as Bluetooth, radio frequency connection, infrared connection, WIFI connection or any other suitable method to communicate command signals from smart device 56. Connection between master unit 50 and smart device 56 is a two way communication channel. Smart device 56 can send control signals to master unit 50 to control the operation of master unit 50 and media player 51. If smart device 56 sends a command to master unit 50 such that the user that is using smart device 56 wants smart device 56 to display video, then master unit 50 sends video signals via communication channel 57 to smart device 56. The smart device 56 displays the video signal coming from master unit 50 on display 59 of smart device 56. This way, smart device 56 can send commands to master unit 50 and display video signals on display 59 of smart device 56. Smart device 56 can either send commands only, or display video only or can do both of these control function and display function simultaneously.

Figure 2:
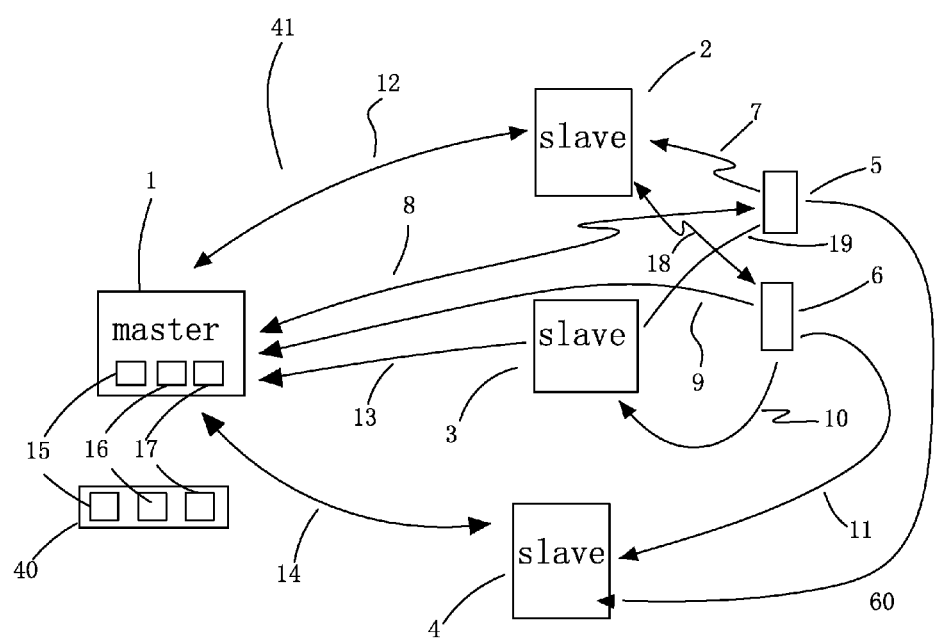
FIG. 2 shows the system configuration with a master unit, multiple slave units and multiple smart units

FIG. 2 shows another embodiment of the invention. In this embodiment there is master unit 1 and slave units 2, 3 and 4. There are three slave units shown in FIG. 2. However the number of slave units can be either 1 or more. There is no upper limit as to the number of slave units. The system in FIG. 2 also has smart devices 5 and 6. Only two smart devices are shown in FIG. 2. There may be one or more smart devices in the system. Master unit 1 is similar to the unit 50 in FIG. 1. System 41 also has media player 40. Media player 40 has either DVD drive, 15, CD drive 16 or Blue ray drive 17. Media player 40 can have any combination of these drives. In FIG. 2 master unit 1 and media player 40 are shown as two separate units. In another embodiment master unit 1 and media player 40 can be combined as one unit. Slave units 2, 3, and 4 have display units on them and they communicate with master unit 1 via communication links 12, 13, and 14 respectively. These communication links 12, 13, and 14 can be wireless or wired communication links. They comprise video signals, audio signals and control signals. If they are wireless links the wireless technology can be Bluetooth technology, radio frequency technology, infrared technology, WIFI connection or any other current or potential wireless technology. Smart devices 5 and 6 are devices with software programs running on them and they may or may not have display devices on them. Smart devices 5 and 6 communicate with master unit 1 via communication channel 8 and 9. Smart device 5 communicates with slave units 2, 3, and 4 via communication channels 7, 19 and 60. Smart device 6 communicates with slave units 2, 3, and 4 via communication channels 18, 10 and 11. Communication links 7, 19, 60, 18, 10 and 11 can be wireless or wired communication links. They comprise video signals, audio signals and control signals. If they are wireless links the wireless technology can be Bluetooth technology, radio frequency technology, infrared technology, WIFI connection or any other current or potential wireless technology. In this embodiment either smart unit 5 or smart unit 6 can control the operation of master unit 1 and slave units 2, 3 and 4. For example smart unit 5 can send a command to master unit 1 to play a media that is placed in media player 40. Smart unit 5 can send another command to master unit 1 directing master unit 1 to send video signal to slave unit 2. Smart unit 5 can send a command to master unit 1, asking master unit 1 to send video signal to smart unit 5. A user that is controlling smart unit 5 can watch the video on smart unit 5's display device. There are many other combinations of commands that are possible in this configuration. If smart unit 5 and smart unit 6 send conflicting commands to master unit 1, master unit 1 performs the most recent command received from any smart device.

Figure 3:
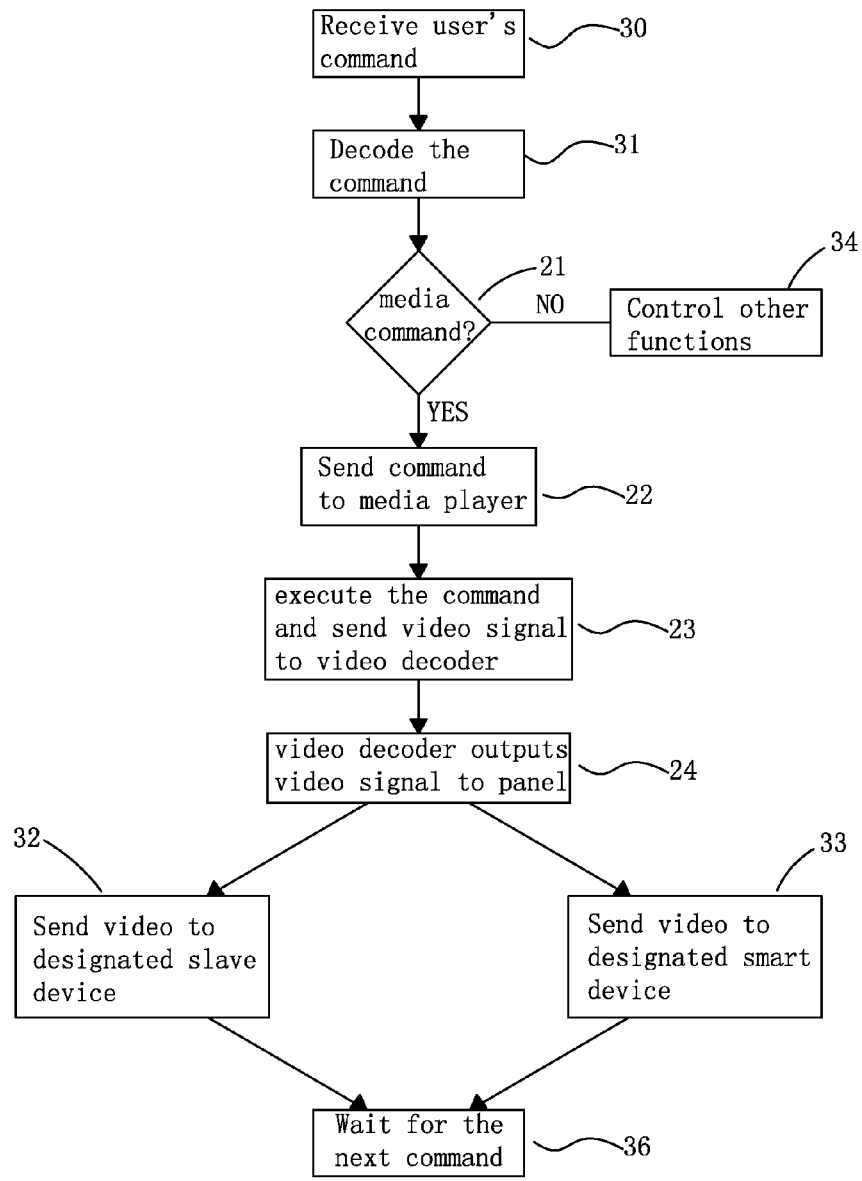
FIG. 3 shows the flow diagram of how the master unit is controlled to distribute video to slave units

FIG. 3 shows another embodiment where a command received from smart devices 5 and 6 are processed by master unit 1. In FIG. 3 in step 30, a user enters a command to smart unit 5 or 6 or to master unit 50. The command is sent to master unit 1 and evaluated by master unit 1. In step 31, the command coming from smart unit 5 or 6 or command entered to master unit 50 is decoded. If the command coming from smart unit 5 or 6 or the command entered to master unit 50 is a media player command then the command is sent to media player in step 22. If the command in step 21 is not a media player command then other function control operation is performed in step 34. In step 23, media player 40 executes the command and sends the video signal to the video decoder. In step 24, the video decoder outputs signal to the panel. In step 32 master unit 1 sends the video signal to one of slave units 2, 3 or 4 or any combination thereof. Furthermore in step 33, master unit 1 may send video signals to smart units 5 or 6 or any combination thereof. Distribution of video signal by master unit 1 depends on the command signal received from smart device 5 or 6 or the command entered to master unit 1. In step 36, the system waits for the next command.

Figure 4:
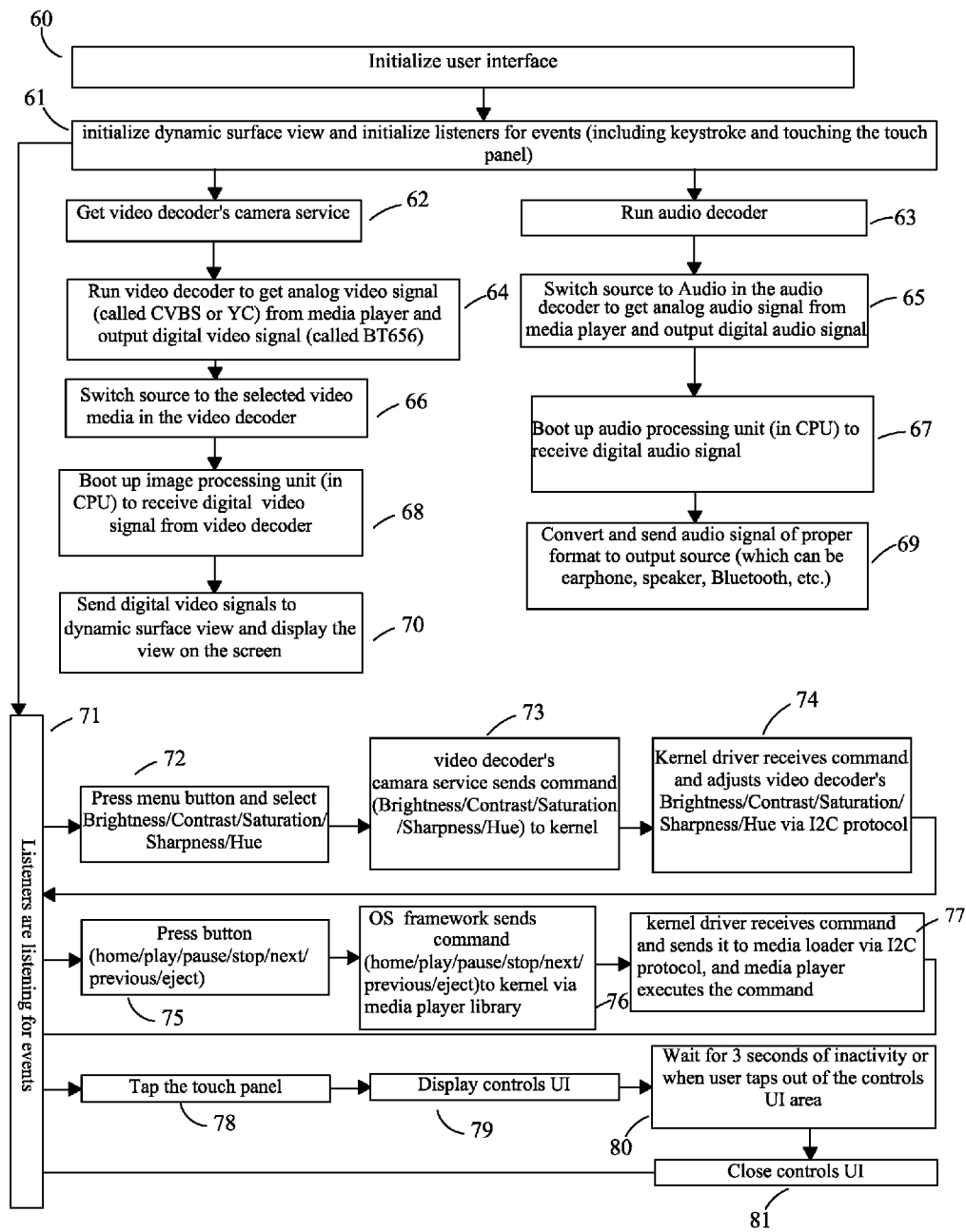
FIG. 4 shows the algorithm used to play DVD or blue ray or other video media based on the command received from the user

FIG. 4 shows the algorithm used to play DVD or blue ray or other video media based on the command received from the user. In step 60 the system initializes the user interface. In step 61, the system initializes dynamic surface view and further initializes listeners for events (misspelling in FIG. 4) including keystroke and the touch panel. In step 62 the system receives video decoder's camera service. In step 64, the video decoder gets the analog video signal from the media player. This analog video signal is called CVBS or YC. The system outputs digital video signal based on the analog video signal input. This digital video signal is called BT656. In step 66 the source is switched to the selected video media in the video decoder. In step 68 the image processing unit is booted up to receive digital video signal from the video decoder. Boot up means start. In step 70 the system sends the digital video signals to dynamic surface view and display view on the screen.

In step 63, the audio decoder is started to perform its operation. In step 65 the source is switched to audio in the audio decoder to get analog audio signal from the media player and output digital audio signal. In step 67 the audio processing unit is booted up to receive digital audio signal. Boot up means start. In step 69, system converts and sends audio signal of proper format to output source. The output source can be earphone, speaker, Bluetooth or any other suitable output device selected by user.

In step 71, listeners in the system listen for events. In step 72 user presses menu button and selects brightness, contrast, saturation, sharpness and hue. In step 73, video decoder's camera sends the command to kernel. The command is among brightness, contrast, saturation, sharpness and hue. There may be additional commands. In step 74, kernel driver receives command and adjusts video decoder's brightness, contrast, saturation, sharpness and hue depending on the selected command. This communication is sent over a line by using I2C protocol or any other suitable protocol.

In step 75, user presses either home, play, pause, stop, eject, next or previous buttons. In step 76, OS framework sends one of the home, play, pause, stop, eject, next or previous commands to kernel via media loader library. In step 77, kernel driver receives command and sends it to media loader by using I2C protocol. The protocol can be any protocol that can transmit signal from one point to the next.

In step 78, user touches the touch panel. In step 79 the system displays commands specified in step 72 and step 75 in a user interface screen. In step 80, the system waits for an input for 3 seconds. If there is no input for 3 seconds or user taps out of the controls UI area, the controls UI disappears in step 81. If user inputs a command via the UI, the system moves to step 73 or 76 depending on the command.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A vehicle video system comprising: a master unit;
   a plurality of slave units;
   a plurality of smart devices;
   a media player;
   an operating system that resides in the master unit; and
   an application program that controls the operation of the master unit and the media player wherein a video signal from the media player is sent to the master unit;
   wherein the plurality of slave units are directly connected to the master unit and to the plurality of smart devices either by wires or wireless connection;
   wherein the plurality of smart devices are directly connected to the master unit and to the plurality of slave units either by wires or wireless connection;
   wherein the media player resides in the master unit; and
   wherein the vehicle video system is installed within a vehicle; wherein smart device is capable of displaying a video content coming from the master unit; wherein the smart device controls the operation of the master unit and the slave units; wherein the smart device can direct video from the master unit to any slave unit; and wherein if there is a conflicting command coming from multiple smart devices, the master unit performs the last command received from any smart device.

2. The vehicle video system of claim 1 wherein a user can control the media player by entering at least one command to the master unit wherein at least one command is sent to the media player by the application program.

3. The vehicle video system of claim 2 wherein the master unit is installed in the head unit compartment of a vehicle seat.

4. The vehicle video system of claim 2 wherein the operating system is selected from a group consisting of Android operating system, Windows operating system, unix operating system, and Mac operating system.

5. The vehicle video system of claim 2 wherein the slave unit can accept commands from a user to turn the slave unit on or off and to increase or decrease the volume of the audio played on the slave unit.

6. The vehicle video system of claim 2 wherein the media played in the media player can be viewed on the slave device and on the smart device.

7. The vehicle video system of claim 2 wherein the smart device is selected from a group consisting of a smart phone and a smart tablet device.

8. The vehicle video system of claim 2 wherein the smart device has a video display.

9. The vehicle video system of claim 2 wherein the smart device does not have a video display and it has control buttons located on it.

10. The vehicle video system of claim 2 wherein the smart device further comprises a touch panel.

11. A method of displaying video signal on the vehicle video system of claim 2 the method comprising:
    receiving command from the smart device;
    decoding the command;
    sending video to slave device and the smart device depending upon the command;
    controlling different functions including volume; and
    waiting for the next command.

12. The vehicle video system of claim 2 wherein the application program comprising the following steps:
    initializing user interface;
    initializing dynamic surface view and initializing listeners for events;
    getting video decoder's camera service;
    running video decoder to get analog video signal from media player and outputting a digital video signal;
    switching source to the selected video media in the video decoder;
    booting up the image processing unit to receive digital video signal from video decoder; sending digital video signal to dynamic surface view and display the view on the screen.

13. The vehicle video system of claim 12 wherein the application program further comprising the following steps:
    running audio decoder;
    switching source to audio in the audio decoder to get analog audio signal from media player;
    outputting digital audio signal;
    booting up audio processing unit to receive digital audio signal; and
    converting and sending audio signal of proper format to an output source.

14. The vehicle video system of claim 13 wherein the application program further comprising the following steps:
    receiving a user's command either from a button or from a touch panel;
    sending the user's command to kernel driver;
    adjusting the video decoder based on the user's command wherein the user's command can be selected from a group consisting of brightness, contrast, saturation, sharpness and hue.

15. The vehicle video system of claim 14 wherein the application program further comprising the following steps:
    receiving a user's command either from a button or from a touch panel;
    sending the user's command to kernel driver;
    sending the user's command to the media player; and
    executing the user's command wherein the user's command can be selected from a group consisting of home, play, pause, stop, eject, next and previous.

16. The vehicle video system of claim 2 wherein the master unit sends a stream of data to at least one slave unit.

* * * * *